United States Patent [19]
Almeida

[11] Patent Number: 5,567,313
[45] Date of Patent: Oct. 22, 1996

[54] CONDENSATE FILTER HOUSING

[76] Inventor: Juan G. Almeida, 1980 Folkway Dr., Mississauga, Ontario, Canada, L5L 3G8

[21] Appl. No.: 356,975

[22] Filed: Dec. 16, 1994

[51] Int. Cl.⁶ ............................................. B01D 24/46
[52] U.S. Cl. .................... 210/108; 210/120; 210/275; 210/411; 210/436
[58] Field of Search ................................ 210/108, 130, 210/275, 411, 436, 472, 120

[56] References Cited

U.S. PATENT DOCUMENTS

| | | | |
|---|---|---|---|
| 1,789,961 | 1/1931 | Astrom | 210/288 |
| 2,344,251 | 3/1944 | Kathe | 210/288 |
| 4,191,651 | 3/1980 | Cheysson et al. | 210/274 |
| 5,068,029 | 11/1991 | Tiggelbeck et al. | 210/288 |

*Primary Examiner*—Ivars Cintins
*Attorney, Agent, or Firm*—Dennis L. Kreps

[57] ABSTRACT

A cylindrical condensate filter housing is disclosed for the containment of a condensate filter media. The housing includes a domed, removable top member for the filter housing, and the domed top includes mounting means within its domed section for (1) a balanced pressure thermostatic air vent, (2) a backwash water inlet, (3) a filtered condensate outlet, and (4) a safety valve.

1 Claim, 2 Drawing Sheets

CONDENSATE FILTER HOUSING

BACKGROUND OF THE INVENTION

Boilers used in power generating plants employ a complex plumbing system for handling the feedwater supply to the boilers, the heat exchangers for generating steam from the feedwater, and the condensers which condense the steam and return the condensate as feedwater to be recycled through the boilers. This plumbing is especially vulnerable to scale, sludge accumulation and corrosion, all of which may reduce boiler system efficiency and capacity, raise system operating power requirements, and cause steam losses and excessive maintenance requirements. Scale on the heat exchanger surfaces acts as an insulator and prevents heat from passing through the heat exchanger walls to the water in the tubes, causing the tubes to become overheated and weakened. Additionally, if less heat is absorbed by the boiler water, then more heat will pass out through the exhaust from the boiler and be lost.

SUMMARY OF THE INVENTION

The condensate filter housing of this invention is designed to hold a specially formulated filter media which effectively removes particulate contaminants from the condensate feedwater or cooling tower water. This filter protects the condensate pipelines, water, tanks, make-up tanks, deaerator and boiler tubes from fouling, plugging, erosion, and excessive wear, and will help avoid prolonged downtime for maintenance and resulting loss of productivity.

The condensate filter housing is designed for simplicity of operation and maintenance, utilizing a few basic parts for easy disassembly and servicing using simple tools. The filter effectively reduces scale and corrosion by removing iron, sludge accumulation and dirt from the boiler condensate.

The condensate filter housing allows a backwashing procedure for cleaning and rejuvenating the filter media when needed.

Designed as a stand-alone cylindrical unit, the condensate filter housing has domed top and bottom caps. Near the bottom of the tank is a stainless steel screen which separates a gravel supporting bed from the filter media. Just above the screen is a perforated feed pipe which enters the side of the filter housing and extends across the diameter of the housing. An inspection cover for the feed pipe is installed in the opposite wall of the housing.

The domed top is removable for servicing, and includes the filtered feedwater outlet, a fresh water inlet for backwashing and rinsing of the filter media, a balanced pressure thermostatic air vent with air eliminator and a safety valve. The filtered water outlet includes a wire cloth screen supported by a cylindrical canister formed from a perforated sheet of stainless steel. A perforated pipe extends into the center of the outlet canister to withdraw the filtered condensate and return it to the boiler system.

All of the fittings for the filter housing, except for the condensate infeed pipe, are mounted on the removable domed top cap, which facilitates maintenance and renewal of the filter media.

DETAILED DESCRIPTION OF THE PREFERRED EMBODIMENT

Figure 1:
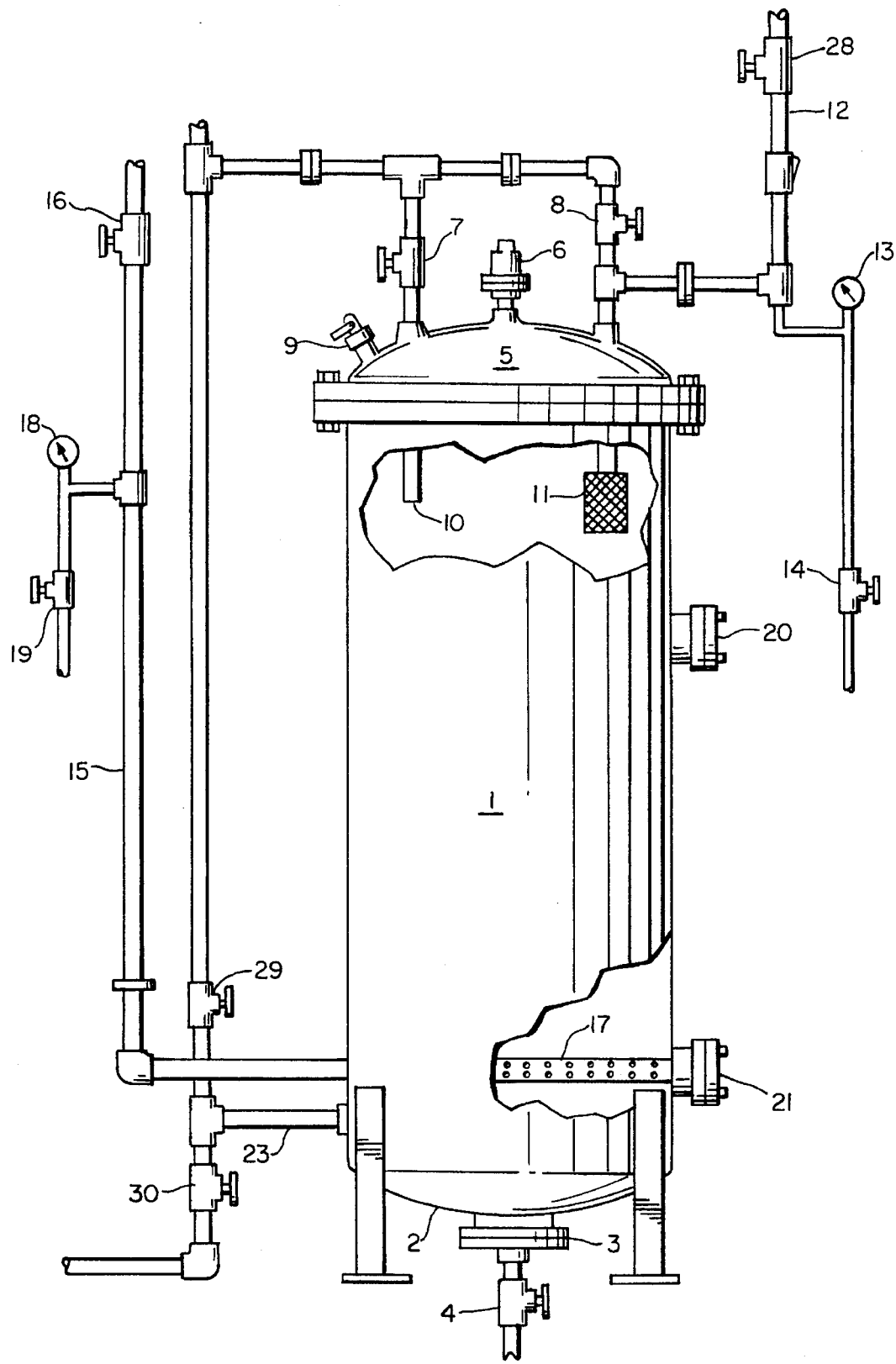
FIG. 1 is a front elevational view of the condensate filter housing of the invention, including partial sections at the top and bottom thereof to reveal the internal parts.

The condensate filter housing, as illustrated in FIG. 1, includes an elongated cylindrical body 1 with integral domed bottom 2, said bottom including an inspection cover 3 with integral drain valve 4.

The top cap 5 is secured to main body 1 by bolts mounted along its peripheral flange. Cap 5 includes a balanced pressure thermostatic air vent 6 with an air eliminator feature, a top backwash inlet valve 7, a screen backwash inlet valve 8 and a safety valve 9. Seen within the body 1 through the upper partial section are backwash inlet 10 and filtered condensate outlet screen 11. Outlet screen 11 connects the filtered condensate with boiler feedwater line 12. A pressure gauge 13 is provided on this line, as well as a drain valve 14.

As shown through the lower partial section of FIG. 1, the condensate inlet pipe 15, controlled by inlet valve 16, directs the unfiltered condensate through perforated pipe 17 into the base of the filter housing. Pressure gauge 18 and drain 19 are also affixed to inlet pipe 15.

Standard inspection covers 20 and 21 are provided on the side of main body 1 to facilitate maintenance of the filter media and associated plumbing during use.

Pipe 22 and its associated valving is attached to the city water supply for supplying rinse water backwashing of the filter media. The rinse water inlet and outlet is shown at 23, and the backwash inlet is provided through valve 7.

Figure 2:
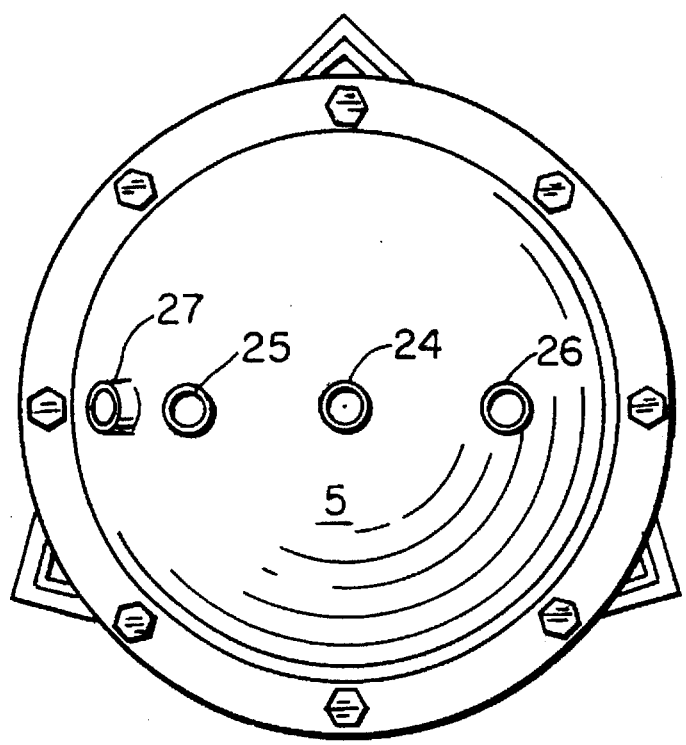
FIG. 2 is a plan view of the domed top with its multiple, fittings.

FIG. 2 is a plan view of the domed top of the filter housing, with the mounting nipples 24, 25, 26 and 27 shown for attachment of balanced pressure thermostatic air vent 6, backwash water inlet valve 7, screen backwash valve 8 and safety valve 9, respectively.

In operation, a gravel supporting bed is placed in the very bottom of the condensate filter housing, covering inspection cover 3 and drain 4. A stainless steel screen (not shown) is placed on top of the gravel, and a filter media (also not shown) is placed. atop the stainless steel screen. Ideally, the filter media is comprised of a mixture of silicon dioxide, aluminum oxide, anthracite, almandite garnet, ferric oxide, filter gravel, calcium oxide, manganese oxide, potassium oxide, sodium oxide and titanium oxide, the exact formulation of which is the subject of a copending application by the inventor of this invention.

Once the housing is filled and top cap 5 is sealed, the filter housing is ready for use. Unfiltered condensate arrives from the power plant through pipe 15 and is fed into the filter housing through inlet pipe 17. After passing through the filter media, the filtered condensate is withdrawn from the filter housing through outlet screen 11, and is returned to the boiler through pipe 12.

When the filter media has accumulated enough scale and impurities to affect its performance (as indicated by pressure gauges 13 and 18), the media within the filter housing may be backwashed to clean and rejuvenate the media for further use. This is accomplished by closing valves 16 and 28 to remove the filter from the boiler condensate circuit, closing valve 29 and opening valves 7, 8 and 30, which backwashes the filter by forcing city water down through backwash inlet 10 and outlet screen 11, through the filter media, and out through the filter media, and out through inlet/outlet 23 and through valve 30 to a drain sewer or the like, carrying all of the scale and impurities flushed from the filter media with it. The valve closings and openings are then reversed and the filter is ready for service once again.

We claim:

1. In an upright cylindrical condensate filter housing having a domed lower end and an open upper end, an unfiltered condensate inlet and a backwash water outlet, said housing containing a filter media for the removal of scale and impurities from said condensate, a removable domed top member sealingly engaging said open upper end of said housing, said top member including (1) a balanced pressure thermostatic air vent, (2) a backwash water inlet, (3) a filtered condensate outlet, and (4) a safety valve, and mounting means for said air vent, said backwash water inlet, said filtered condensate outlet and said safety valve secured to said top member, all of said elements and their mounting means contained within the domed portion of said top member.

* * * * *